(12) United States Patent
Spisak

(10) Patent No.: US 6,831,588 B2
(45) Date of Patent: Dec. 14, 2004

(54) RANGE RECOGNIZER EMPLOYING A SINGLE RANGE INTERNALLY PARTITIONED BY MONOTONICALLY INCREASING BOUNDARY VALUES

(75) Inventor: Kevin C. Spisak, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 118 days.

(21) Appl. No.: 10/245,945

(22) Filed: Sep. 17, 2002

(65) Prior Publication Data

US 2003/0069705 A1 Apr. 10, 2003

Related U.S. Application Data

(60) Provisional application No. 60/326,494, filed on Oct. 1, 2001.

(51) Int. Cl.[7] ............................................... H03M 1/58
(52) U.S. Cl. ..................... 341/170; 341/169; 382/181; 714/736
(58) Field of Search ................................. 341/169, 170, 341/156, 159; 382/181; 714/736, 39

(56) References Cited

U.S. PATENT DOCUMENTS

| | | | | |
|---|---|---|---|---|
| 4,237,387 A | | 12/1980 | Devendorf et al. | |
| 4,475,237 A | * | 10/1984 | Glasby | 382/181 |
| 4,692,897 A | * | 9/1987 | Crabbe, Jr. | 714/736 |
| 4,752,928 A | * | 6/1988 | Chapman et al. | 714/39 |
| 5,164,728 A | * | 11/1992 | Matsuzawa et al. | 341/159 |
| 5,579,006 A | | 11/1996 | Hasegawa et al. | |
| 6,590,518 B1 | * | 7/2003 | Taft | 341/156 |

* cited by examiner

*Primary Examiner*—Jean Bruner Jeanglaude
(74) *Attorney, Agent, or Firm*—Thomas F. Lenihan

(57) ABSTRACT

A range recognizer applies acquired data to the inputs of a plurality of boundary comparators simultaneously, treating an entire range of values for the data as a single continuum which is partitioned by a series of internal boundaries that are monitonically increasing. Each boundary comparator compares the value of the data with its unique boundary value and provides the results to a single range encoder logic to generate a single binary word as an encoded result indicative of the comparison for the entire range. An upper boundary result of one boundary comparator is combined with a lower boundary result of an adjacent higher boundary comparator prior to input to the single range encoder logic. The result is a reduction In the number of output pins required on an integrated circuit (IC) for reporting the encoded result for a corresponding plurality of range recognizers.

6 Claims, 2 Drawing Sheets

RANGE RECOGNIZER EMPLOYING A SINGLE RANGE INTERNALLY PARTITIONED BY MONOTONICALLY INCREASING BOUNDARY VALUES

CLAIM FOR PRIORITY

The subject application claims priority from U.S. Provisional patent application Ser. No. 60/326,494, RANGE ENCODING FOR MORE RANGES AND/OR FEWER PINS (Kevin C. Spisak), filed Oct. 1, 2001.

FIELD OF THE INVENTION

The subject invention generally concerns the field of range recognizers for test and measurement instruments, such as logic analyzers, or the like, and specifically concerns a range encoder in an integrated circuit that provides more ranges or requires fewer connection pins.

BACKGROUND OF THE INVENTION

A range recognizer is a well-known circuit used in a logic analyzer trigger structures to identify input vectors that reside within a particular range of values. In such a range recognizer, two binary comparators are used to determine if an input vector lies between two predetermined boundaries. If data is sampled in more than one integrated circuit (IC or chip), the results produced by the comparators in a first one of the ICs must be passed to a second IC where it is combined with the results from second IC. This fact leads to the unfortunate situation that, the more range recognizers there are, the more IC pins and board space must be used.

A prior art range recognizer implementation used by Tektronix in the TLA 700 Logic Analyzer, requires twelve pins to convey signals to and from each of four range recognizers. That is, three pins per range recognizer are used to encode "greater than", "lesser than", or "equal to" the upper boundary and lower boundary.

As ICs become ever more complex, reduction of pin count and conservation of printed board space (commonly referred to as a "real estate") becomes critical. What is needed is a range recognizer that produces the desired range comparison signals while also reducing IC pin count and conserving printed board space.

SUMMARY OF THE INVENTION

A range recognizer arrangement in accordance with the subject invention, requires only five IC pins to convey an encoded signal from a group of four range recognizers, and requires only twelve IC pins to convey an encoded signal from a group of over one thousand range recognizers. The subject range recognizer arrangement includes circuitry for combining and monotonically sorting all of the predetermined range boundaries, rather than treating each range recognizer as a separate unit. A range recognizer arrangement in accordance with the subject invention is suitable for use with test and measurement instruments such as a logic analyzer or the like.

DETAILED DESCRIPTION OF THE EMBODIMENTS

Figure 1:
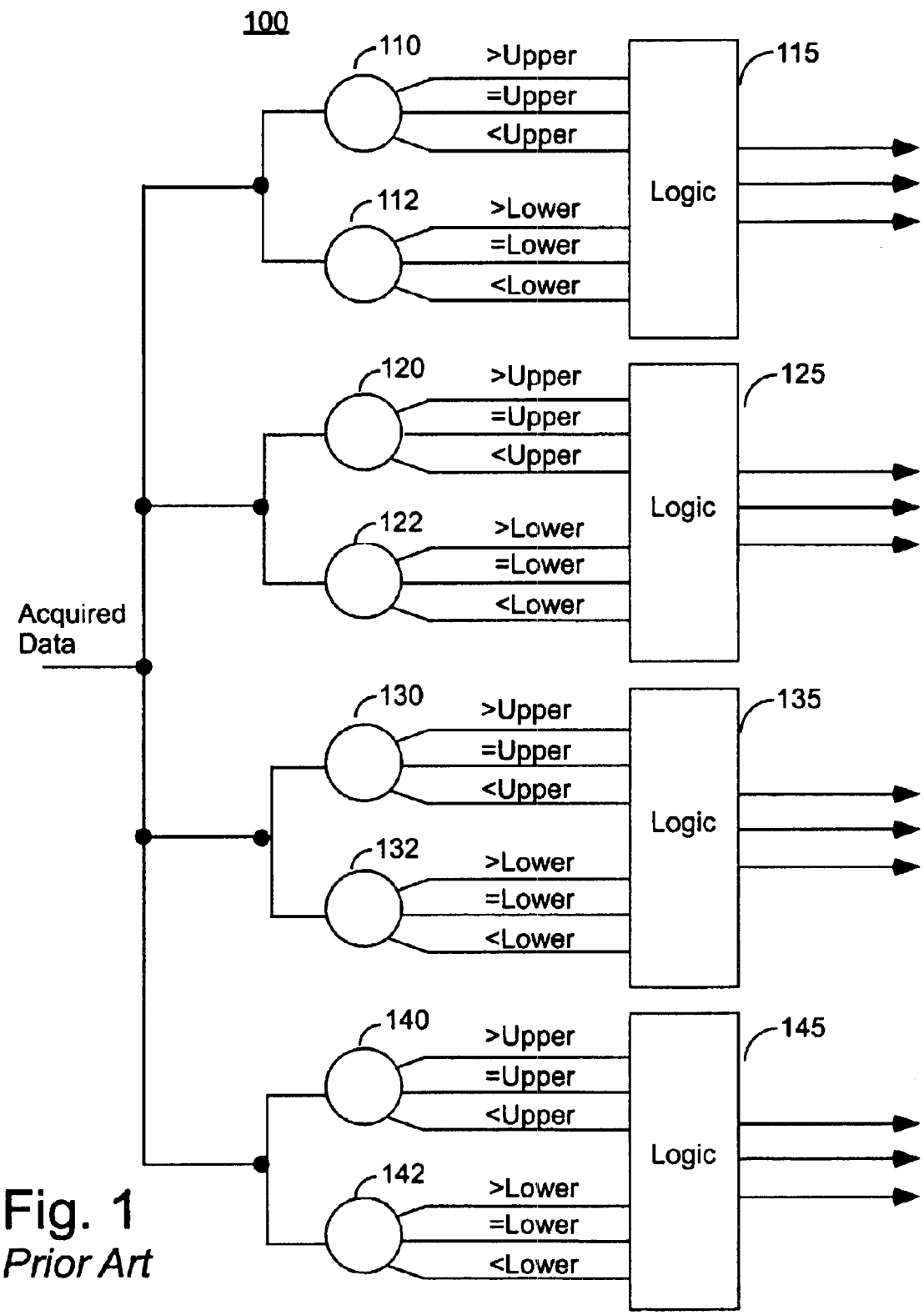
FIG. 1 is a simplified block diagram of a range recognizer arrangement as known from the prior art.

FIG. 1 shows and arrangement 100 of four range recognizers as known from the prior art. Each range recognizer includes a pair of boundary comparators (110, 112) (120, 122) (130, 132) (140, 142) and a range encoder logic unit 115, 125, 135, 145. Each Upper Boundary Comparator (110, 120, 130, 140) is preprogrammed with its unique upper boundary value. Each Lower Boundary Comparator (112, 122, 132,142) is preprogrammed with its unique lower boundary value. In operation, acquired data is applied to the respective inputs of all of the boundary comparators simultaneously. Each boundary comparator compares the value of the newly acquired data with its predetermined stored unique boundary value and provides the results of that comparison to its respective range encoder logic unit. Note that for each boundary comparator there are three output lines defining nine possible outcomes as shown in Table 1.

TABLE 1

| Possible Outcomes | Upper Boundary Comparator | Upper Boundary Comparator | Comments |
|---|---|---|---|
| 1 | > Upper Boundary | > Lower Boundary | Valid |
| 2 | > Upper Boundary | = Lower Boundary | Can be eliminated |
| 3 | > Upper Boundary | < Lower Boundary | Can be eliminated |
| 4 | = Upper Boundary | > Lower Boundary | Valid |
| 5 | = Upper Boundary | = Lower Boundary | Valid |
| 6 | = Upper Boundary | < Lower Boundary | Can be eliminated |
| 7 | < Upper Boundary | > Lower Boundary | Valid |
| 8 | < Upper Boundary | = Lower Boundary | Valid |
| 9 | < Upper Boundary | < Lower Boundary | Valid |

Note from the Comments column of Table 1 that Possible Outcomes 2, 3, and 6 can be eliminated from consideration by swapping the upper boundary value and the lower boundary value when the upper boundary is less then the lower boundary. Three bits are required for encoding the remaining six valid possible outcomes, as shown by the three output lines from each range encoder logic unit of FIG. 1.

As noted above, a range recognizer arrangement as known from the prior art, including four range recognizers requires twelve output lines to encode all the possible valid outcomes, thereby using up twelve valuable IC pins, and the print board "real estate" to route the printed conductors to those IC pins. This undesirable situation results from the fact that each of the four range recognizers provides its own independent evaluation for any given sample of acquired data. For example, assume that a given sample of acquired data happens to have a value that is less than the upper boundary and greater than the lower boundary of boundary comparators 130, 132. This condition is possible outcome number 7 of Table 1. In such a case range encoder 135 produces an output indicating that the acquired data sample is within its range. Unfortunately and unnecessarily, all of the other range encoders 115, 125, 145 will produce indications that the acquired data sample is out of their respective ranges. The subject invention will now be described with reference to FIG. 2 and Table 2.

Figure 2:
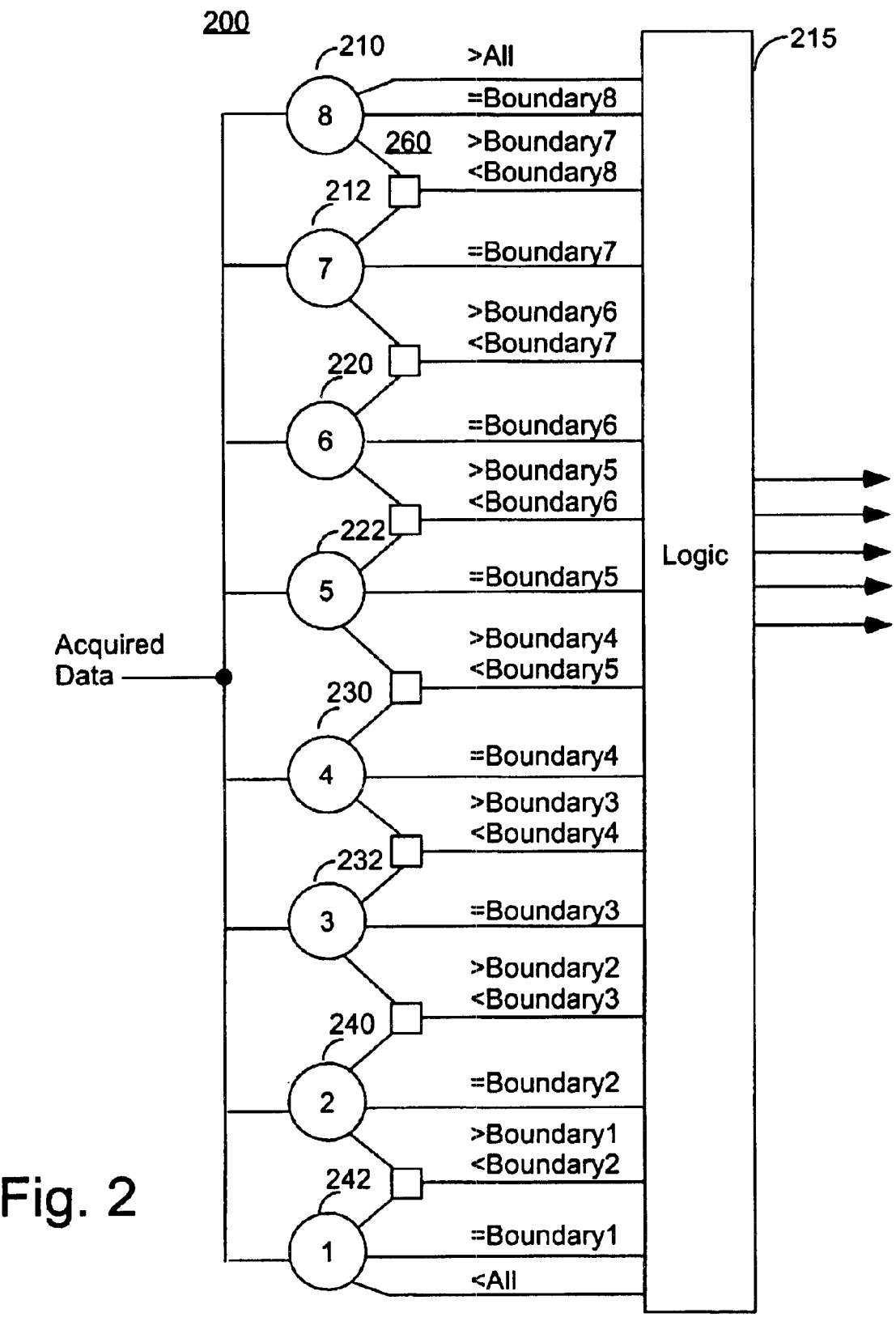
FIG. 2 is a simplified block diagram of a range recognizer arrangement in accordance with the subject invention.

FIG. 2 shows a range recognizer arrangement in accordance with the subject invention. The arrangement of FIG. 2 performs the task of comparing acquired data values with four bounded ranges (as did the arrangement of FIG. 1). Referring to FIG. 2, each of boundary comparators 210, 212, 220, 222, 230, 232, 240, 242 is preprogrammed with a respective unique boundary value. In operation, acquired data is applied to the respective inputs of all of the boundary comparators 210, 212, 220, 222, 230, 232, 240, 242 simultaneously. Each boundary comparator compares the value of the newly acquired data with its predetermined stored unique boundary value but unlike the prior art, each boundary comparator provides the results of its comparison to a single range encoder logic unit 215. It is herein recognized that for a group of four range recognizers, use of the subject invention limits the result to only seventeen different possible outcomes: "greater than all", "less than all", "equal to one", or "between two of eight" boundary values. One skilled in the art will note that only five IC pins are required to encode the seventeen possible outcomes. Note that this arrangement of boundary comparators defines seventeen possible outcomes as shown in Table 2.

Note that in Table 2 all boundaries have been presorted from lease to highest in value. Thus, all seventeen possible outcomes represent valid comparison states. Five bits are more than enough for encoding the seventeen possible outcomes, as shown by the five output lines from range encoder logic unit 215 of FIG. 2.

TABLE 2

| | Possible Outcomes |
|---|---|
| 1 | > All Boundaries |
| 2 | = Boundary 8 |
| 3 | Between Boundaries 7 and 8 |
| 4 | = Boundary 7 |
| 5 | Between Boundaries 6 and 7 |
| 6 | = Boundary 6 |
| 7 | Between Boundaries 5 and 6 |
| 8 | = Boundary 5 |
| 9 | Between Boundaries 4 and 5 |
| 10 | = Boundary 4 |
| 11 | Between Boundaries 3 and 4 |
| 12 | = Boundary 3 |
| 13 | Between Boundaries 2 and 3 |
| 14 | = Boundary 2 |
| 15 | Between Boundaries 1 and 2 |
| 16 | = Boundary 1 |
| 17 | < All Boundaries |

In the apparatus of FIG. 2, those output lines from the boundary comparators that appear to join with output lines from an adjacent comparator at a node may in fact be combined by means of an OR-gate, or WIRE-OR logic (shown as a series of combining blocks 260 for simplicity).

It is important to note that in the subject invention, the entire range is treated as a single continuum that is partitioned by a series of internal boundaries whose values has been sorted in a numeric order (i.e., monotonically increasing). This realization allows a single range encoder to generate a single binary word indicative of the comparison the acquired data with the entire range.

In contrast, prior art range recongizers envision a series of independent ranges, each with its own upper and lower boundary, which boundaries may overlap. As such, prior art range recognizer arrangements must make multiple independent comparisons of the same data within each range. Advantageously, the subject invention provides a single answer. In contrast, as noted above, the prior art provides four independent answers, three unnecessary.

Currently, the number of range recognizers used in today's logic analyzers is limited. This limitation is primarily due to the number of pins each range recognizer uses. An arrangement according to the subject invention allows the number of range recognizers to increase exponentially with respect to number of IC pins required, instead of exhibiting a linear relationship as in the prior art. Use of the subject invention makes it both possible and practical to do a real-time Performance Analysis of a thousand ranges, while only using twelve IC pins.

One skilled in the art will recognize that the circuitry of the subject invention may be embodied in discrete logic, or in an ASIC or FPGA, for example. While the subject invention has been described in the environment of a logic analyzer, use of the invention is not intended to be so limited. Use of the subject invention for measurement of range data in other instruments, such as oscilloscopes, is deemed to fall within the scope of the following claims.

What is claimed is:

1. An arrangement of range recognizers, comprising:

a first boundary comparator preprogrammed with a first boundary value;

a second boundary comparator preprogrammed with a second boundary value, said second boundary value being greater than said first boundary value;

each of said first and second boundary comparators being coupled to a common input for receiving acquired data, and determining if said acquired data is greater than, less than, or equal to its respective boundary value;

combining circuitry for combining a signal from said first boundary comparator representative of said determination that said acquired data is greater than said first boundary value, and a signal from said second boundary comparator representative of said determination that said acquired data is less than said second boundary value, and developing a combined signal indicative of a condition in which said acquired data has a value between said first and second boundary values;

a range encoder for receiving signals from said first and second comparators and from said combining circuitry, said signals indicating only one of:

said acquired data has a value less than said first boundary value, said acquired data has a value equal to said first boundary value, said acquired data has a value between said first and second boundary values, said acquired data has a value equal to said second boundary value, or said acquired data has a value greater than said second boundary value;

said range encoder generating a binary word indicative of said comparison of said acquired data with said boundary values.

2. The range recognizer arrangement of claim 1, further including a third boundary comparator programmed with a boundary value higher than said second boundary value;

third boundary comparator being coupled to said common input for receiving said acquired data, and determining if said acquired data is greater than, less than, or equal to its respective boundary value; and second combining circuitry for combining a signal from said second boundary comparator representative of said determination that said acquired data is greater than said second boundary value, and a signal from said third boundary comparator representative of said determination that said acquired data is less than said third boundary value, and developing a combined signal indicative of a condition in which said acquired data has a value between said second and third boundary values.

3. The range recognizer arrangement of claim 2 wherein, said range encoder receives all signals from said comparators indicative of said acquired data being greater than or less than a respective boundary value via said combining circuitry, except for:
  a signal generated by the comparator having the lowest stored boundary value indicating that said acquired data has a value less than all of said boundary values; and
  a signal generated by the comparator having the highest stored boundary value indicating that said acquired data has a value greater than all of said boundary values.

4. The range recognizer arrangement of claim 3 further including:
  fourth through eighth boundary comparators; and
  third through seventh combining circuits coupled as set forth in claim 2;
  said fourth comparator being programmed with boundary value greater than that of said third comparator, and so on through said eight comparator.

5. The range recognizer arrangement of claim 4 wherein said range encoder has seventeen input lines for receiving one of seventeen possible states, and encodes said one of seventeen possible states in a five-bit binary word.

6. An arrangement of range recognizers, comprising:
  a plurality of boundary comparators each preprogrammed with a respective boundary value of a range; wherein said range is partitioned by a monotonically increasing series of said boundary values;
  each of said boundary comparators being coupled to a common input for receiving acquired data, and determining if said acquired data is greater than, less than, or equal to its respective boundary value;
  circuitry for combining a signal from a lower adjacent one of said boundary comparators representative of said determination that said acquired data is greater than said its respective boundary value, and a signal from said a higher adjacent boundary comparator representative of said determination that said acquired data is less than said its respective boundary value, and developing a combined signal indicative of a condition in which said acquired data has a value between said lower adjacent and higher adjacent boundary values; and
  a single range encoder for receiving signals from all of said comparators and from all of said combining circuitry,
  said range encoder generating a binary word indicative of said comparison of said acquired data with said boundary values.

* * * * *

UNITED STATES PATENT AND TRADEMARK OFFICE
CERTIFICATE OF CORRECTION

| | | |
|---|---|---|
| PATENT NO. | : 6,831,588 B2 | Page 1 of 1 |
| APPLICATION NO. | : 10/245945 | |
| DATED | : December 14, 2004 | |
| INVENTOR(S) | : Kevin C. Spisak | |

It is certified that error appears in the above-identified patent and that said Letters Patent is hereby corrected as shown below:

Col. 2, Line 17,
Third column of Table 1 should read:

"Lower Boundary Comparator" not "Upper Boundary Comparator"

Signed and Sealed this

First Day of August, 2006

JON W. DUDAS
*Director of the United States Patent and Trademark Office*